United States Patent
Li et al.

(10) Patent No.: US 12,489,928 B1
(45) Date of Patent: Dec. 2, 2025

(54) SYSTEMS AND METHODS FOR LOW LATENCY AND LOSSLESS CONTENT STREAMING

(71) Applicant: Amazon Technologies, Inc., Seattle, WA (US)

(72) Inventors: Xiangbo Li, San Jose, CA (US); Selvanayagam Sendurpandian, Livermore, CA (US); Benjamin Hirsch, San Francisco, CA (US); Nagendra Akula Suresh Babu, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/431,238

(22) Filed: Feb. 2, 2024

(51) Int. Cl.
| | |
|---|---|
| *H04N 21/2187* | (2011.01) |
| *H04N 19/40* | (2014.01) |
| *H04N 21/234* | (2011.01) |
| *H04N 21/235* | (2011.01) |
| *H04N 21/237* | (2011.01) |
| *H04N 21/24* | (2011.01) |

(52) U.S. Cl.
CPC ......... *H04N 21/2187* (2013.01); *H04N 19/40* (2014.11); *H04N 21/23406* (2013.01); *H04N 21/2353* (2013.01); *H04N 21/237* (2013.01); *H04N 21/2404* (2013.01)

(58) Field of Classification Search
CPC ......... H04N 21/2187; H04N 21/23406; H04N 21/2353; H04N 21/237; H04N 21/2404; H04N 19/40
See application file for complete search history.

(56) References Cited

U.S. PATENT DOCUMENTS

| | | | | |
|---|---|---|---|---|
| 9,479,720 | B1 * | 10/2016 | Hegar | .................. H04L 65/765 |
| 2014/0337903 | A1 * | 11/2014 | Zhu | .................... H04N 21/2387 |
| | | | | 725/90 |
| 2020/0382803 | A1 * | 12/2020 | Zhang | .................... H04N 19/40 |
| 2024/0073462 | A1 * | 2/2024 | Chen | .................. H04N 21/2187 |
| 2025/0097524 | A1 * | 3/2025 | Zhang | .............. H04N 21/44004 |

* cited by examiner

*Primary Examiner* — Nicholas T Corbo
(74) *Attorney, Agent, or Firm* — Eversheds Sutherland (US) LLP

(57) ABSTRACT

Systems and methods for low latency and lossless content streaming are provided. Particularly, an improved system architecture is provided that reduces the latency that may occur between a live stream going online and content first being presented to viewer devices. The improved system architecture also mitigates or eliminates content loss that may occur when a transcode server performing transcoding for the live stream crashes. To accomplish these benefits, the improved system architecture includes a buffer within the ingest server that receives content from the broadcaster device. The use of the buffer allows the content to be more quickly accessed by the transcode server, therefore reducing latency. The use of the buffer also eliminates content loss that may otherwise occur in the live stream or a recording of the live stream (for a video on demand).

18 Claims, 10 Drawing Sheets

SYSTEMS AND METHODS FOR LOW LATENCY AND LOSSLESS CONTENT STREAMING

BACKGROUND

Existing live streaming architectures, while scalable, may encounter challenges due to communication latency among services. When a transcoder process commences the transcoding of incoming content associated with a live stream upon the stream going live, several seconds of media content may already be lost. Additionally, the real-time nature of live streaming necessitates that the transcoder waits for the entirety of a media segment before completing the transcoding process, introducing latency in the live stream.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element, depending on the context, may encompass a plural number of such components or elements and vice versa.

DETAILED DESCRIPTION

Figure 1A:
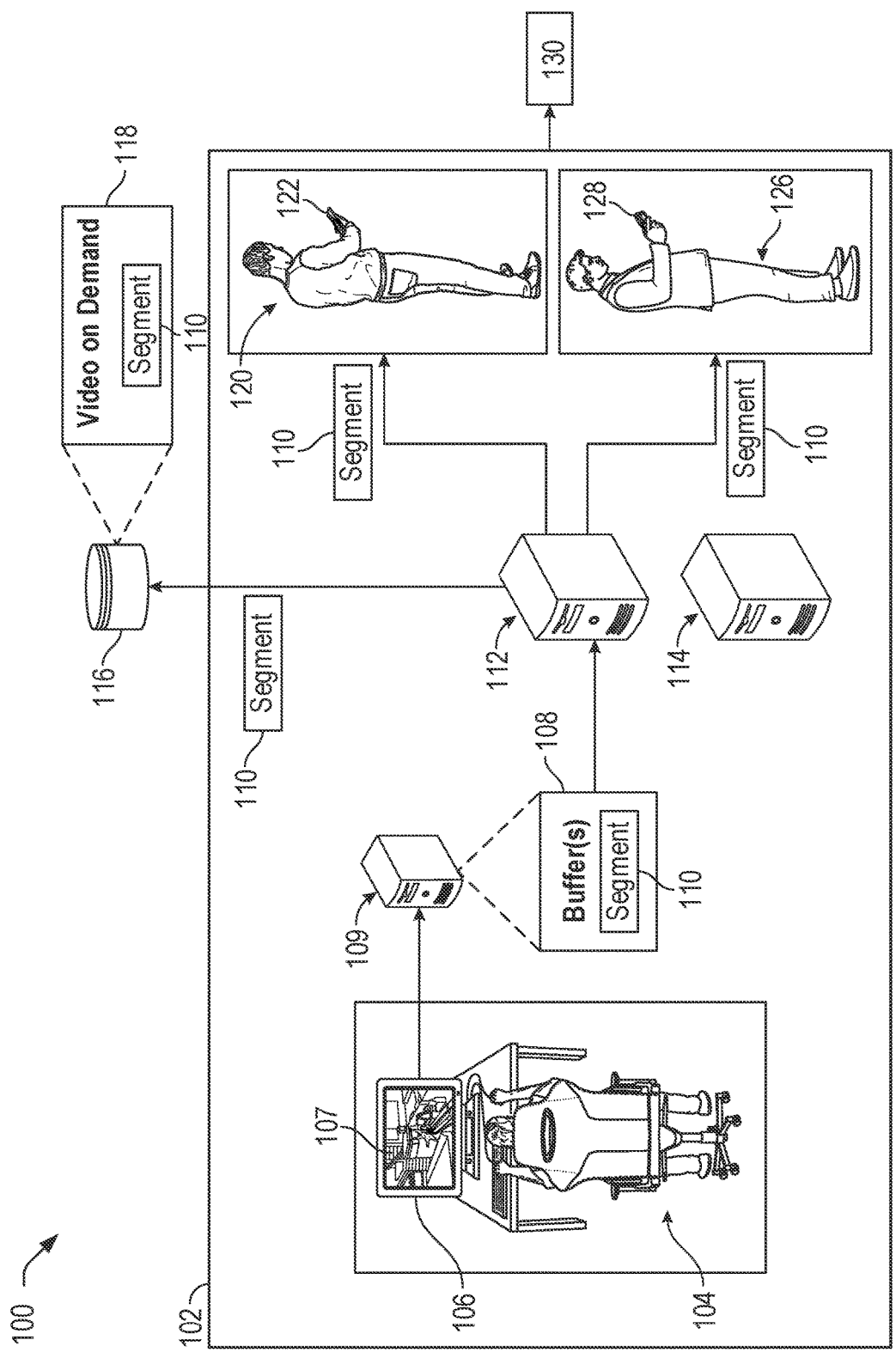
FIGS. 1A-1B depict an example use case for low latency and lossless content streaming in accordance with one or more example embodiments of the disclosure.

This disclosure relates to, among other things, systems and methods for low latency and lossless content streaming. Specifically, the systems and methods may be applicable to live streaming services. A live streaming service may be a service by which content associated with a live stream may be received from broadcaster device(s), processed, and transmitted to various types of viewer devices (e.g., a mobile phone, smart television, desktop or laptop computer, tablet, etc.) such that viewers may view the live stream in real-time. A viewer may access the live streaming service through a website, application, or any other suitable mechanism. The viewer may select a "channel" associated with a particular type of content to view a live stream associated with that channel via the device used to access the live streaming service (assuming the channel is currently "live"). That is, the live streaming service may provide the viewer with options for viewing a variety of different types of content depending on the channel that is selected by the viewer.

As one example, a first content creator may broadcast, via a first channel, a live stream of a video game that the content creator is playing. A viewer can access the first channel using a viewer device to watch the first content creator play the video game. As another example, a second content creator may broadcast, via a second channel, a live stream presenting a camera feed of a mobile device of the second content creator at a live event, such as a game convention. The viewer may access the second channel using the viewer device to watch the feed of the live event. As further non-limiting examples, the content may include a stream of a live sporting event or may be pre-recorded content, such as educational videos, that are live streamed for viewing. These are merely examples of types of content that may be viewed, and any other types of content may be presented to viewers via the live streaming service as well.

Additionally, in some instances, recordings (referred to as "video on demand" or "VOD" herein) of the live content may also be produced such that a viewer may view the content even after the live stream has ended. For example, a content creator may live stream content within a certain time frame during a day, but a viewer may not be able to view the content during that time frame for any number of different reasons (e.g., the viewer may be otherwise occupied and unable to view the content at that time). After the live stream has ended, the VOD may be stored, and the viewer may access the VOD at a time that is convenient to the viewer to view the content (even if the live stream has ended and the content is no longer being live broadcasted).

The systems and methods described herein improve over existing live streaming architectures by reducing latency that causes delays between the generation of the content at the content source and the content being presented on a viewer device. The systems and methods also mitigate or eliminate content loss that may occur during the live streams. As a first example, the systems and methods may reduce latency that may occur in presenting content to viewers when a live stream begins broadcasting (a delay between the time at which the broadcast begins and the content is received by the viewer device and presented to the viewer). As a second example, the systems and methods may reduce latency and content loss when a software and/or hardware failure occurs during a live stream. As a third example, the systems and methods may provide latency reduction when the live stream service transitions between usage of different hardware during a live stream for a particular content creator. These are merely examples of use cases for which the systems and methods may be applicable and are not intended to be limiting.

In embodiments, these improvements may be effectuated by providing a buffer within the server that receives and stores the content from the broadcaster device(s) associated with the live stream. For example, the buffer may store video and/or audio segments received from the broadcaster device(s). A buffer may be a reserved segment of memory (such as random-access memory (RAM) or any other type of memory) that is used to temporarily hold data being processed.

By providing this buffer in this server, when a transcode server commences processing content associated with the live stream, the transcode server may retrieve the content from the buffer, rather than receiving the content in real-time as it is received from the broadcaster device(s). In existing systems, the transcode server otherwise may be required to perform real-time data retrieval, which may introduce increased latency. The buffer therefore enables the transcode server to rapidly retrieve and initiate processing on all available content. Using the first use case as an example, this allows the initial media segments of the live stream to become available much sooner compared to the conventional real-time data waiting process. Moreover, since all content is cached within the buffer, content loss prior to stream startup is entirely averted. Further details about the ingest server, transcoder, and other hardware and/or software elements of the live streaming service are provided in at least FIG. 2.

Figure 1B:
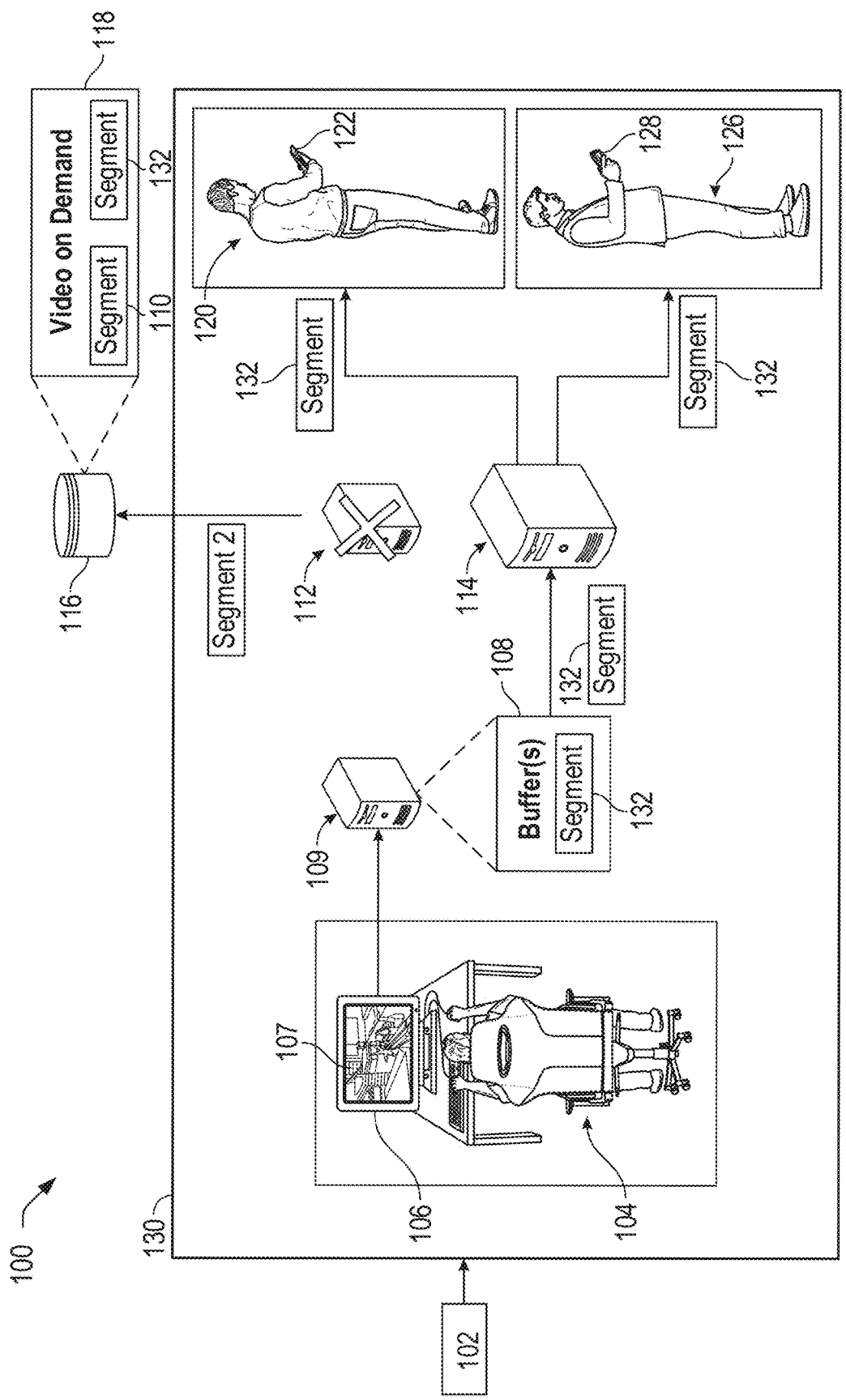

Turning to the figures, FIGS. 1A-1B depict an example use case 100 for low latency and lossless content streaming. Particularly, the use case 100 illustrates one application of the improved system architectures described herein in reducing or eliminating content loss in a stored recording of a live stream. As aforementioned, the improved system architectures described herein may also provide other benefits, such as reducing live stream startup latency, among other benefits.

The use case 100 begins with scene 102. Scene 102 shows a first user 104 playing a video game 107 on a desktop computer 106 (which may be an example of a broadcaster device, such as broadcaster device(s) 202-602). The first user 104 may be a content creator with a channel on a live streaming service. The first user 104 may produce live stream content for the live streaming service that may be viewed by one or more viewers (for example, second user 120 and third user 126) via one or more viewer devices (for example, viewer device 122 and viewer device 128). Although the viewer devices in the use case 100 are shown as being mobile devices, this is merely for exemplary purposes and any other types of devices may also be used to view the live stream. Further, although two viewers are shown, any other number of viewers may also view the live stream as well.

The first user 104 is shown as live streaming a play through of a video game 107 that the first user 104 is playing on the desktop computer 106. However, the first user 104 may also produce other types of live-streamed content as well. Although the figure only shows a desktop computer 106, other types of hardware and/or software may also be used to produce the live stream (such as a hardware or software encoder, a camera, etc.). Reference to any actions being performed by the desktop computer 106 is merely for simplicity and any other of such hardware and/or software may similarly be used to perform the tasks. Further any reference to a single segment is also for simplicity and any other number of segments may also be transmitted and/or processed in a manner described herein.

After the first user 104 indicates that a live stream should initiate (for example, the first user 104 may select an option for the channel to go "live" and begin live streaming content via the live streaming service, which may be referred to herein as a "broadcast start event"), the desktop computer 106 may begin transmitting segments of content for processing. The segments may include audio and/or video segments (and/or other types of data) relating to the content being live streamed, such as the video game 107, a camera feed of the first user 104, etc. The segments may be transmitted to a remote server 109, which may include a buffer 108. The remote server 109 may be part of a backend system (such as datacenter 203 shown in FIG. 2 and/or any other datacenter described herein or otherwise, as one example). However, some or all of the processing may also be performed locally at the desktop computer 106 (or other broadcaster device(s)) and/or the viewer devices as well. The remote server 109 may facilitate processing of the content received from the desktop computer 106 before the content is transmitted to the one or more viewer devices. Such processing may include, for example, transcoding the content such that the content may be transmitted to individual viewer devices at various video resolutions. Any other types of processing tasks may also be performed.

FIG. 1A shows a first segment 110 being transmitted to the remote server 109. The first segment 110 may be temporarily stored within the buffer 108 for further processing by any backend systems used to process the content before it is transmitted to various viewer devices for presentation. This process may continue with additional segments being stored in the buffer 108 for processing. The use of the buffer 108 is an improvement over existing system architectures that do not include such a buffer as it reduces processing latency and mitigates or eliminates content loss, as is described in additional detail below.

As a part of the processing, the content (including the first segment 110) is transcoded by a transcode server (such as first transcode server 112) before being transmitted to the one or more viewer devices. The first segment 110 is shown as being transcoded by the first transcode server 112 and the transcoded content is then transmitted to both the viewer device 122 and the viewer device 128 such that the second user 120 and the third user 126 may both view the live stream content. To reduce the latency of this process, the first transcode server 112 retrieves the first segment 110 from the buffer 108.

Additionally, copies of the segments received from the desktop computer 106 may also be stored within data storage 116 (such as a database, for example). This allows for a recording (which may be referred to as a video on demand 118 (or VOD) of the live stream to be saved such that a viewer may watch the live stream even after the live stream has ended. For example, even after the live stream has ended, the second user 120 may access the channel on the live streaming service and may select the video on demand 118 to watch a recording of the same content that was presented in real-time during the live stream.

Continuing the use case 100 with FIG. 1B, scene 130 shows the first transcode server 112 experiencing a failure event. A failure event may be any condition that results in the server being unavailable for at least a period of time (for example, the server crashed due to a software and/or hardware fault, experiences a connectivity issue and is unable to communicate with other servers, etc.). For example, the transcode server 112 may experience a hardware and/or software issue that may cause the transcode server 112 to become at least temporarily unavailable to transcode segments received from the desktop computer 106. When such a failure event occurs, the second transcode server 114 may be instructed to take over transcoding content received from the desktop computer 106. However, there may be a delay between the first transcode server 112 experiencing the failure event and the second transcode server 114 beginning to perform transcoding tasks. In conventional system architectures, this delay may result in segments of content being lost (for example, not being processed and transmitted to the viewer devices and/or not being provided to the data storage 116 to add to the video on demand 118). Thus, content gaps may exist when such failure events occur.

The improved system architectures described herein address these latency and content loss problems by continuing to store segments (such as second segment 132) in the buffer 108. Thus, the segments are still available to be accessed by the second transcode server 114, including the segments that were received during the delay period. These segments may be processed by the second transcode server 114 and combined with prior segments already stored in the data storage 116 such that a continuous video on demand 118 may still be saved in the data storage 116 for future viewing. Further details about the improved system architectures are provided below in at least the system architects of FIGS. 2-6.

Figure 2:
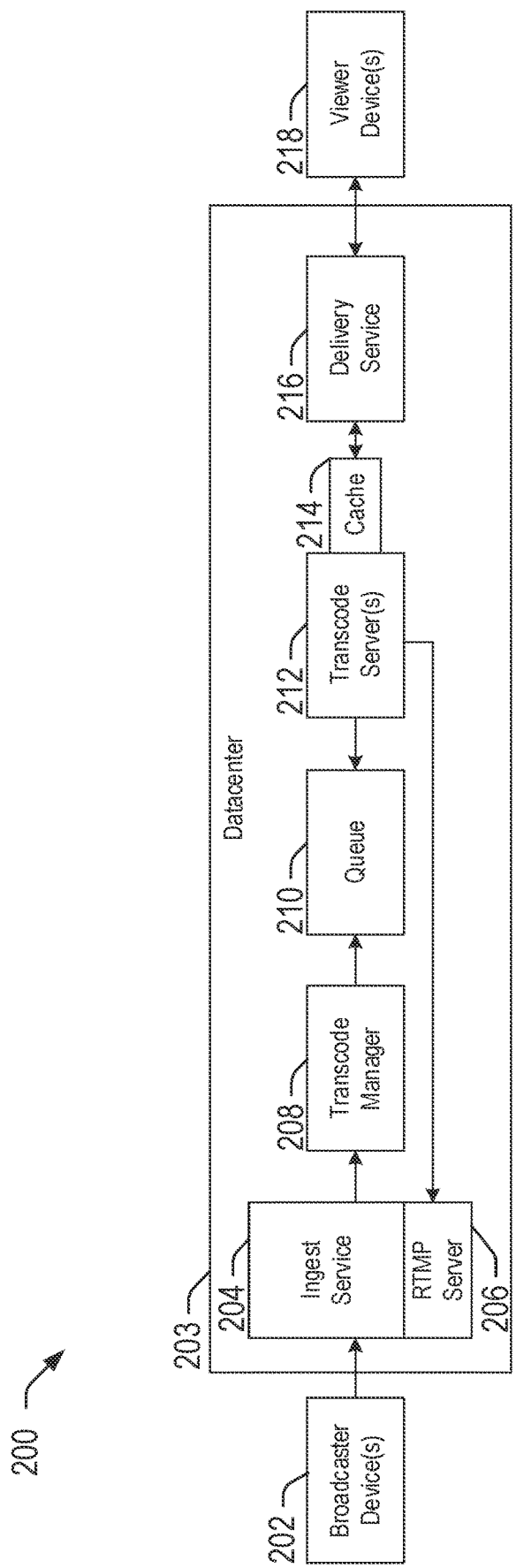
FIG. 2 depicts an example system architecture for content streaming in accordance with one or more example embodiments of the disclosure.

FIG. 2 depicts an example system architecture 200 for content streaming. Particularly, the system architecture 200 represents an existing system architecture for receiving live-streamed content from broadcaster device(s) 202, processing the live-streamed content, and transmitting the live-streamed content to viewer device(s) 218. The system architecture 200 includes one or more broadcaster device(s) 202, a datacenter 203, and one or more viewer device(s) 218. The datacenter 203 may include an ingest service 204 (which may use a media server 206, such as an RTMP server), a transcode manager service 208, a queue 210, transcoder server(s) 212 including cache 214, and a delivery service 216. Reference to a single element (such as a broadcaster device 202, viewer device 218, transcode server 212, etc.) is not necessarily intended to limit such element to only a single element. For example, reference may be made to transmitting content to a viewer device 218; however, the content may also be transmitted to any other number of viewer devices 218 as well. Similarly, when reference is made to multiple elements, this is also not intended to be limiting and a single element may also be used instead.

In embodiments, the broadcaster device(s) 202, datacenter 203, and viewer device(s) 218 may be provided at separate locations. For example, the broadcaster device(s) 202 may be provided at a content source (such as a location of a content creator, a storage location for pre-recorded content, etc.), the datacenter 203 may be provided at a remote location at which the content is received from the content source for processing, and the viewer device(s) 218 may be located at any suitable location remote from the broadcaster device(s) 202 such that viewers may view the live content at any location. However, any of these elements of the system architecture 200 may also be provided at the same location as well. For example, some of the elements of the datacenter 203 may be provided at the same location of the broadcaster device(s) 202, etc.

In embodiments, the broadcaster device(s) 202 may include any device or combination of devices used to capture and/or transmit any content to the datacenter 203 for processing. As one non-limiting example, the broadcaster device(s) 202 may include a desktop or laptop computer (however, other types of devices may also be used) used by a content creator that is producing live streamed content for a channel on the live streaming service. The broadcaster device(s) 202 may include hardware and/or software used to capture video and/or audio to transmit to viewer device(s) 218 as a part of the live stream. For example, a content creator may primarily produce live-streamed content involving the content creator playing a video game on a desktop computer. The same desktop computer may include software that captures video and/or audio of the video game as the content creator plays the video game in real-time. Alternatively, the content creator may include a first desktop computer on which the video game is played and a second device (such as a second desktop computer, for example) that is dedicated to capturing the video and/or audio content. In some instances, the content may be pre-recorded and stored on a broadcaster device 202 but may be transmitted in real-time to the viewer device(s) 218 during a live stream.

The broadcaster device(s) 202 may also include any other types of devices that are used to capture, process, and/or transmit the content. For example, hardware encoders may be used to encode the captured content and/or perform any other tasks associated with providing the live streamed content to the datacenter 203 and/or viewer device(s) 218. This functionality may also be provided through software (continuing the same example, the software may be provided on the first desktop computer and/or the second desktop computer) as well. Additionally, other types of auxiliary hardware may be provided, such as one or more cameras that capture live feeds of the content creator themselves such that a video of the content creator may be provided as an overlay in the live stream being viewed on the viewer device(s) 218. The aforementioned description of the broadcaster device(s) 202 is merely exemplary and any other types of devices may also be used.

In embodiments, the live streaming service may include a number of "channels" that viewers may access to view different live streams (and other types of content associated with the channel, such as VODs, for example). For example, different content creators (a channel does not necessarily need to be associated with a content creator, however) may create different channels with the live streaming service. A viewer may access the live streaming service in any manner described herein or otherwise and select a channel to view content associated with the channel. Thus, the live streaming service may receive, process, and transmit content associated with multiple live streams simultaneously (including various broadcaster device(s) 402 provided at different locations).

The viewer device(s) 218 may be devices that present the content received from the broadcaster device(s) 202 to various viewers (that is, the viewer device(s) 218 allow the viewers to watch the live stream). For example, the viewer device(s) 218 may be mobile phones, desktop or laptop computer, tablets, gaming consoles, smart televisions, etc. A viewer may access the live streaming service through a website, application, etc. and may select a particular channel to view a live stream associated with the channel (assuming the channel is currently "live"). The viewer may also be able to access recordings of previous live streams as well.

The live streaming service may also allow viewers to select various settings, such as a resolution at which the content is to be streamed to a viewer device 218. This setting may be desirable given the range of capabilities of viewer device(s) 218, such as processing power of the viewer device(s) 218 (for example, hardware comments, such as a central processing unit (CPU), graphics processing unit (GPU), etc.), varying network connectivity strengths, etc. For example, a first viewer device may be connected to the Internet via a slower connection than a second viewer device. The first viewer device may also (or alternatively) include hardware with lower processing capabilities than the second viewer device. Thus, a first viewer may select a lower resolution (as a non-limiting example, 720p) at which the content is to be streamed via the first viewer device and a second viewer may select a higher resolution (as a non-limiting example, 1440p) at which the content is to be streamed via the second viewer device. In some instances, the live streaming service may also be configured to automatically select such settings. For example, information about a connection strength of the first viewer device may be provided to the live streaming service, and the live streaming service automatically may indicate for the content to be live streamed to the first viewer device at a lower resolution. This is merely one example of a setting and the viewer device(s) 218 may also allow the viewers to configure other settings associated with the live-streamed content.

In embodiments, the datacenter 203 may host the backend servers used to perform processing of content received from the broadcaster device(s) 202. For example, the datacenter 203 may include the ingest service 204, transcode manager service 208, queue 210, transcode server 212 including the cache 214, and the delivery service 216. The datacenter 203 may be provided at a single location or some of the elements of the datacenter 203 may be provided at different locations as well.

The ingest service 204 may be responsible for managing and processing data received from the broadcaster device(s) 202. For example, the ingest service 204 may receive content associated with a live stream transmitted from the broadcaster device(s) 202. The ingest service 204 may also receive other information, such as a request from the broadcaster device(s) 202 to initiate a new live stream.

The transcode manager service 208 may be tasked with orchestrating and creating transcode jobs tailored to the requirements of broadcasters associated with the broadcaster device(s) 202, as well as the requirements of the viewer device(s) 218 receiving the content for presentation. In this system architecture 200, one or more of the broadcaster device(s) 202 initiate the publishing of media content to the ingest service 204, which utilizes a media server 206 (e.g., an RTMP server) to serve the incoming content. Simultaneously, the ingest service 204 triggers the transcode manager 208 to generate a transcode job, which is subsequently placed in a synchronized queue 210, awaiting processing by a transcoder server 212. The transcoded content is stored in the datacenter cache 214. When the delivery service 216 receives a request from a viewer device 218 to present content associated with the live stream, the delivery service 216 retrieves the content from the datacenter cache 214, facilitating seamless playback of the content to the viewer device(s) 218.

The transcode manager 208 also tracks the status of the various transcode server(s) 212. For example, the transcode manager 208 may periodically send a message to any transcode server(s) 212 currently tasked with performing transcoding for one or more channels. If the transcode manager 208 does not receive a response within a threshold period of time, then the transcode manager 208 may determine that the particular transcode server experienced a failure event (for example, the transcode server has experienced a hardware and/or software issue or is otherwise at least temporarily unavailable to perform transcoding tasks). The transcode manager 208 may also make this determination in any other suitable manner. As one further non-limiting example, the transcode manager 208 may passively receive periodic messages from the transcode servers 212 to determine that the transcode servers have not experienced a fault event and are still able to perform transcoding tasks.

When the transcode manager 208 determines that a particular transcode server performing transcoding tasks for a live stream has experienced a failure event, the transcode manager 208 may then send an instruction to another transcode server to take over performing transcoding tasks for the live stream. The new transcode server may then begin performing transcoding tasks for the live stream in place of the original transcode server (to allow the live stream to continue regardless of the failure event with the original transcode server).

The transcode server 212 may be responsible for executing transcode jobs and applying specified settings to transform video content. Generally, transcoding may involve receiving encoded (or "compressed") video or other digital content, decompressing the content, and altering and re-compressing the content into a different form. For example, a high-resolution video captured by a broadcaster device 202 may be transcoded into video content of different resolutions depending on the resolution at which the content is to be presented on the various viewer device(s) 218 receiving the content. For example, as aforementioned, a first viewer device may have a slower network connection than a second viewer device. Given this, the transcode server 212 may transcode the content received from the broadcaster device(s) 202 into a first resolution for presented on the first viewer device and a second resolution for presentation on the second viewer device. This is merely one example, and the transcoding may be used to transform the content in any other suitable manner.

In embodiments, one transcode server 212 may be used to perform any number of different types of changes to the content received from the broadcaster device(s) 202. However, in some instances, different transcode servers 212 may be dedicated to perform specific types of alterations to the content. For example, a first transcode server 212 may be dedicated to transcoding the content received from the broadcaster device(s) 202 to content at a 720p resolution for transmittal to one or more viewer device(s) 218. A second transcode server 212 may be dedicated to transcoding the content to content at a 1080p resolution for transmittal to one or more other viewer device(s) 218. A single transcode server 212 may also be configured to transcode the content to multiple different resolutions as well.

The delivery service 216 may handle requests from viewer device(s) 218 and may also ensure the efficient delivery of content to the viewer device(s) 218. For example, the delivery service 216 may receive an indication from a viewer device 218 that a viewer uses to view a live stream associated with a particular channel on the live streaming service. The delivery service 216 may also receive other types of relevant information, such as a resolution at which it is desired for the content to be streamed to the viewer device 218. In some instances, the delivery service 216 may also receive other types of information and may automatically determine (or another element of the datacenter 203 may automatically determine) the resolution at which the content should be streamed to the viewer device 218. For example, the viewer device 218 may provide hardware information, network connectivity information, and/or any other types of information that may be used to automatically determine a resolution at which to stream the content. Any other types of information may also be provided to the delivery service 216 as well. That is, while the ingest service 204 may be responsible for handling communications with the broadcaster device(s) 202, the delivery service 216 may be responsible for handling communications with the viewer device(s) 218.

The delivery service 216 may receive such requests and information from a number of different viewer devices 218 to view content for the same channel on the live streaming service. Additionally, the delivery service 216 may also receive requests to view different content associated with multiple channels on the live streaming service. The delivery service 216 may receive and manage all of these requests to ensure that the correct content associated with the relevant channel is provided to the correct viewer device 218 at the correct resolution.

This existing system architecture 200, while scalable, encounters challenges due to communication latency between the various services given that the datacenter 203 may include communications between multiple servers (for example, the services shown in the figure may be hosted on multiple servers). When the transcode server 212 process commences the transcoding of incoming content, several seconds of content may already be lost. Additionally, the real-time nature of live streaming necessitates that the transcode server 212 waits for the entirety of a content segment before completing the transcoding process, introducing further latency. Additionally, the transcode server 212 may crash and be unviable to perform transcode tasks when there is a failure event associated with the transcode server 212. A resilient system may initiate another transcoder and continue processing the previous stream. However, there can be seconds or even minutes gap between the original transcode server crashing and the transcoding being transitioned to a different transcode server, which means that content is usually lost during this period of time.

Figure 3:
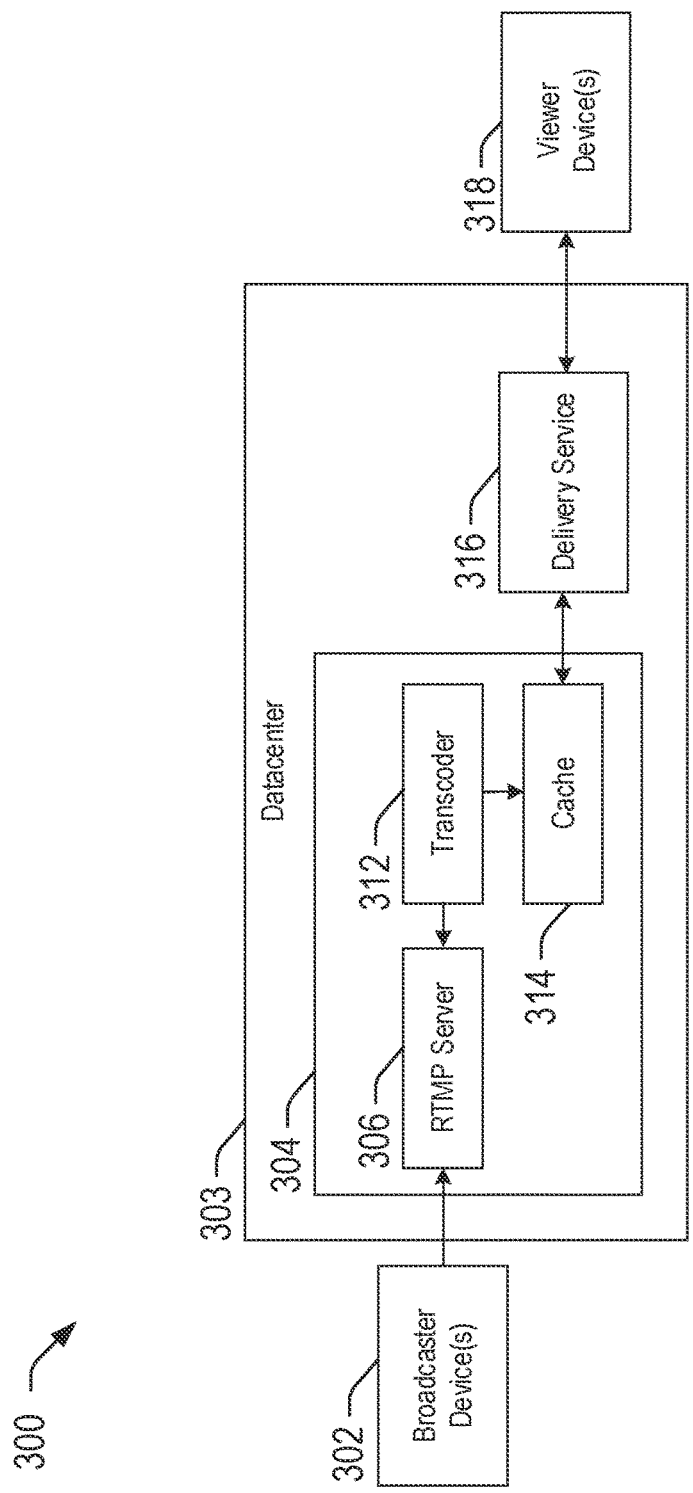
FIG. 3 depicts another example system architecture for low latency and lossless content streaming in accordance with one or more example embodiments of the disclosure.

FIG. 3 depicts an example system architecture 300 for low latency and lossless content streaming. The system architecture 300 represents an improvement to the existing system architecture 200 shown in FIG. 2. The system architecture 300 may include at least some similar elements as the system architecture 200. For example, the broadcaster device(s) 302 may be the same as broadcaster device(s) 202, the delivery service 316 may be the same as delivery service 216, etc.

The system architecture 300 differs from the system architecture 200 in that the RTMP server 306, the transcoder 312, and the cache 314 may be provided on the same server (for example, the server 304). Providing these processes on the same server may reduce latency as communications between separate servers may not be required to for the backend processes performed at the datacenter 303 to be performed. Processed content may be stored in local cache 314 on the same server (for example, the server 304), facilitating direct retrieval by the delivery service 316 in response to requests from a viewer device 318. This optimization reduces both latency and content loss. While the system architecture 300 shows particular elements of the existing system architecture 200 as being provided on the same server, any other combinations of different elements may also be provided on the same server as well. In particular embodiments, all of the elements of the datacenter 203 in the system architecture 200 may be provided on the same server in a similar manner shown in FIG. 3.

Although the system architecture 300 provides an improvement to the existing system architecture 200, the system architecture 300 may result in all processes on the same server being unavailable if the server 304 experiences a failure event. Additionally, the system architecture 300 may be limited in terms of scalability. While the RTMP server 306 can effectively manage hundreds or even thousands of streams, the transcoder 312 may be constrained to processing a limited number of streams concurrently, primarily dictated by the hardware configuration of the server 304. Consequently, the overall media server 304 may only be able to support a substantially reduced number of streams, necessitating the provisioning of additional servers to accommodate higher demand.

Figure 4:
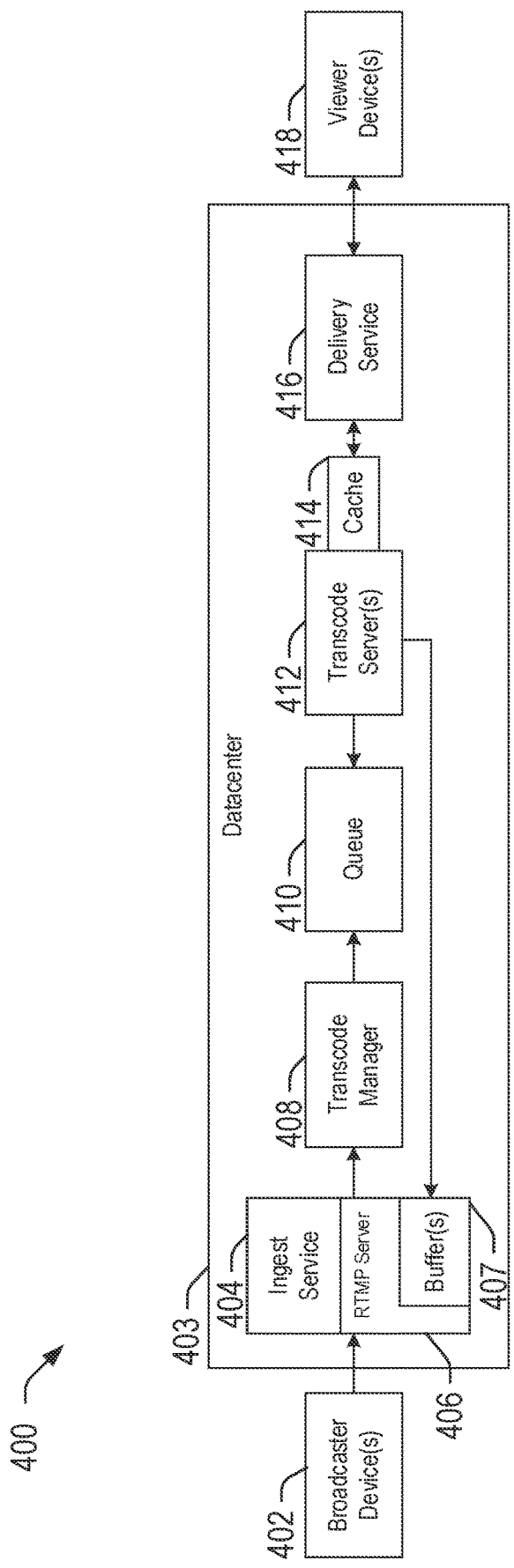
FIG. 4 depicts another example system architecture for low latency and lossless content streaming in accordance with one or more example embodiments of the disclosure.

FIG. 4 depicts another example system architecture 400 for low latency and lossless content streaming. The system architecture 400 represents another improvement to the existing system architecture 200 shown in FIG. 2 that mitigates some of the potential bottlenecks of the system architecture 300 shown in FIG. 3. The system architecture 400 may include at least some similar elements as the system architectures 200 and/or 300. For example, the broadcaster device(s) 402 may be the same as broadcaster device(s) 202, the delivery service 416 may be the same as delivery service 216, etc.

The system architecture 400 differs from the system architecture 200 by including a buffer 407 within the RTMP server 406. With the introduction of this buffer 407, when the transcoder server 412 commences content processing, the transcode server 412 may no longer need to rely on real-time data retrieval from the broadcaster device(s) 402 (or other elements of the system). Instead, transcoder server 412 promptly accesses the content stored in the buffer 407 to begin transcoding the content. This eliminates the need for the transcoder server 412 to wait to receive the content and enables the transcoder server 412 to rapidly retrieve and initiate processing on all available content. This buffer 407 may also be provided at any other location within the datacenter 403. In embodiments, multiple buffers may be used as well.

In embodiments, the RTMP server 406 may begin to temporarily store content from the broadcaster device(s) 402 within the buffer 407 before the transcoder server(s) 412 begin transcoding the content to be transmitted to the viewer device(s) 418. The RTMP server 406 may also begin to temporarily store content from the broadcaster device(s) 402 in the buffer 407 before a broadcast start event (for example, receipt of an indication from the broadcaster device(s) 402 that the channel should go "live"), content should begin to be processed and transmitted to the viewer device(s) 418 such that viewers may view the content through the live stream on the channel.

The content that is received from the broadcaster device(s) 402 may be received in segments, such as segments of audio and/or video content, for example, which may be referred to as content segments. Each segment may be a particular duration of content, such as two seconds of content, for example (however, any other segment durations are also possible). In conventional system architectures (such as system architecture 200 shown in FIG. 2), the transcode server(s) 412 may receive live content segments from the ingest service 404. If the content segment is two seconds in duration, then the transcode server(s) 412 may require at least two seconds for transcoding before the first content segment is provided to the viewer device(s) 418 (for example, before the stream is "live" and viewers are able to view the live stream). With the buffered data, the transcoding latency is reduced substantially (as a non-limiting example, from two seconds to 500 ms) or eliminated. Consequently, the initial content segment to be transmitted to the viewer device 418 becomes available much sooner compared to the conventional real-time data waiting process, thereby reducing startup latency associated with a broadcast start event of the live stream.

Moreover, since content is cached within the buffer 407, content loss associated with the live stream may be averted.

For example, if a transcode server performing transcoding tasks for the live stream crashes, a different transcode server may be instructed to take over transcoding tasks. However, there may be a delay between the first transcode server experiencing the failure event and the different transcode server beginning transcoding tasks. Content associated with the period of time between the failure event and the re-initiating of transcoding may be lost in conventional system architectures. However, because the content is cached in the buffer in the improved system architecture 400, this content is still at least temporarily stored when the failure event occurs.

In embodiments, multiple buffers may be provided and different buffers may be allocated to different channels or combinations of channels associated with the live streaming service. For example, a first channel producing first content for viewing by the viewer device(s) 418 may be allocated to a first buffer and all content associated with that first channel may be cached in the first buffer. A second channel producing second content for viewing by the viewer device(s) 418 may be allocated to a second buffer and all content associated with that second channel may be cached in the second buffer. However, the content associated with the first channel and the second channel may be cached in the same buffer. In other embodiments, portions of a channel may be cached in different buffers. Any other use of a single or multiple buffers to cache some or all of the content from one or multiple channels may also be possible.

Additionally, the size of the buffers that are allocated to different channels may vary. That is, in embodiments in which multiple buffers are used, the buffers may not necessarily all have the same storage capacity. For example, a first live streaming channel with a large viewing audience (e.g., several thousand concurrent viewers per live stream) may require more data processing and transcoding than a second live streaming channel with a relatively smaller viewership. Accordingly, a large buffer may be allocated to the first live streaming channel than the second live streaming channel to provide an efficient allocation of memory resources.

In this manner, different channels of the live streaming service may be automatically allocated a buffer of a particular size based on various factors. The allocations may be based on any number of factors and/or combinations of factors in addition to number of concurrent viewers as well. Further non-limiting examples of factors may include a manual request from a channel for a larger buffer size during a specific live stream, etc. Additionally, the buffers may not necessarily be allocated to a channel until the channel goes "live" and begins live streaming content. This may provide for a more efficient use of memory resources as memory is only used as a buffer for a particular channel when the channel is producing content for viewers.

The size of the buffer allocations may also be based on factors that are not specific to any particular channel. For example, the buffer allocations may be based on a likelihood that a particular type of content may experience a larger number of concurrent viewers (across all channels streaming such content) during a given time. Upon the release of a new video game, channels streaming content associated with the new video game often may be associated with a larger number of viewers. Thus, the system may automatically anticipate that such channels may experience a larger number of concurrent viewers during this time and may allocate larger buffers to such channels when it is indicated that the channel is going to be streaming content associated with the video game. As another example, the live streaming service may determine that the live streaming service as a whole is experiencing larger user traffic during a given time period and may allocate larger buffers to all channels on the live streaming service as a result. Likewise, the live streaming service may determine that the live streaming service as a whole is experiencing smaller user traffic during a given time period and may allocate smaller buffers to all channels on the live streaming service as a result.

The buffer allocations that are provided to a particular live stream or multiple live streams may also be dynamic. That is, the buffer allocations that are provided to the live streams may be adjusted in real-time during a live stream, prior to a live stream beginning, and/or under other circumstances. The use of the dynamic buffer allocations may allow for the live streaming service to accommodate variations in the amount of data that is processed for a live stream at any given time. For example, a live stream may experience a first volume of viewership traffic on one day but may experience a much large volume of viewership traffic on another day, or even during the same live stream. While the channel may simply be provided a sufficiently large buffer to account for edge cases involving the largest possible amount of data, a more efficient use of computing resources may be to adjust the amount of buffer that is allocated to the particular channel to accommodate the current and/or predicted amount of data that is being processed and/or may be processed in the future.

In embodiments, the dynamic buffer allocation may be performed in any number of suitable manners. In some instances, the dynamic allocation may involve transitioning between the use of different buffers of varying sizes. For example, a channel may be allocated to a first buffer for caching content and then may be transitioned to using a second buffer of a different size for caching content. These different buffers may be provided on the same server (which may reduce latency in the transition between the buffers if the transition is performed in real-time during a live stream) or the different buffers may also be provided on different servers as well. In other instances, the dynamic allocation may involve adjusting, in real-time, the size of the same buffer that is currently being used as well.

Figure 5:
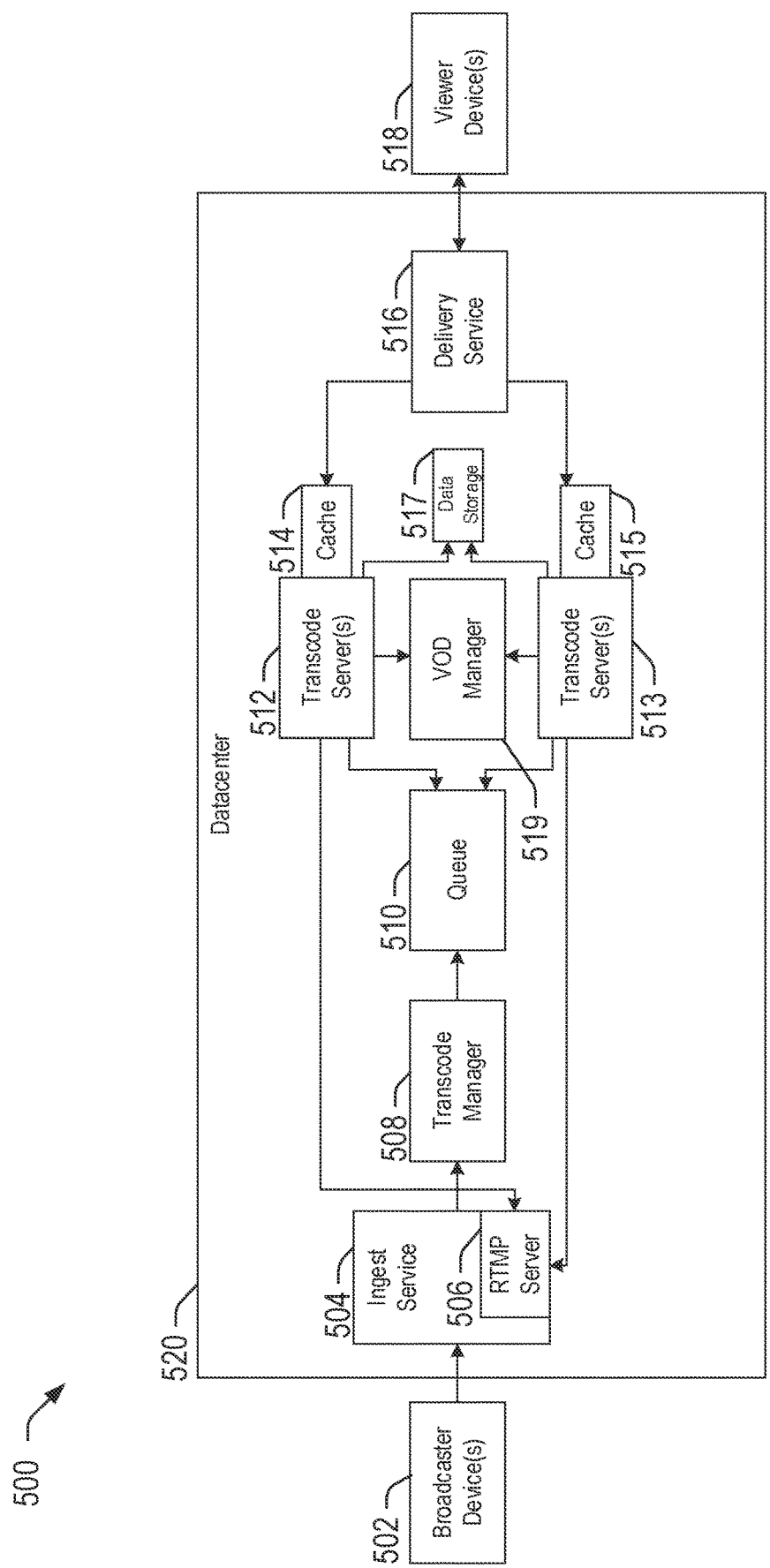
FIG. 5 depicts another example system architecture for low latency and lossless content streaming in accordance with one or more example embodiments of the disclosure.

FIG. 5 depicts another example system architecture 500. Particularly, the system architecture 500 represents a system architecture by which video on demand content is recorded and stored for a given live stream.

The system architecture 500 also includes at least some similar elements as the system architecture 200. For example, the system architecture includes one or more broadcaster device(s) 502, which may be the same as broadcaster device(s) 202, etc. Similar to the system architecture 200, the ingest service 504 may be responsible for managing and processing ingest requests initiated by broadcasters (for example, received from the broadcaster device(s) 502). The transcode manager service 508 may be tasked with orchestrating and creating transcode jobs tailored to the requirements of broadcasters associated with the broadcaster device(s) 502. In this system architecture 500, one or more of the broadcaster device(s) 502 initiate the publishing of content to the ingest service, which utilizes a media server (e.g., an RTMP server) to serve the incoming content. Simultaneously, the ingest service triggers the transcode manager to generate a transcode job, which is subsequently placed in a synchronized queue, awaiting processing by a transcode operation. The transcoded media assets are stored in the datacenter cache. When the delivery service receives a player's request, it retrieves the content from the datacenter cache, facilitating seamless playback.

In contrast with the system architecture 200 shown in FIG. 2, however, the system architecture 500 shows additional transcode servers (for example, a first transcode server 512 including first cache 514 and a second transcoder server 513 with second cache 515 are shown). While two transcode servers are shown in FIG. 5, a system may also include any other number of transcode servers as well.

The system architecture 500 illustrates operations that may occur when one transcode server experiences a failure. For example, the first transcode server 512 initially may be transcoding content for a live stream. When the first transcode server 512 experiences a failure event and is no longer able to transcode content (at least for a period of time), the transcode manager 508 may instruct the second transcode server 513 to begin performing transcoding content for the live stream in place of the first transcode server 512. This allows the live stream content eventually to continue to be presented to the viewer device(s) 518 even if one of the transcode servers is experiencing issues.

The system architecture 500 also includes a VOD manager 519. The VOD manager 519 may be responsible for tracking the state of a VOD being produced for a live stream. As aforementioned, a VOD may be a recording of the live stream that is stored for a viewer to access after the live stream has ended. For example, the VOD may be stored in a database and may be accessible to a viewer through the channel on the live streaming service. The viewer may access the channel even after the live stream has ended and select the VOD to be presented via the viewer device 518. In some instances, the VOD manager 519 may track the state of multiple VODs being produced for different channels at the same time.

In embodiments, every time a transcode server is instructed to begin performing transcoding tasks for a channel, the transcode server may send a message to the VOD manager 519. The message may include any number of different types of information, such as a channel identifier, a session identifier, etc. The channel identifier may provide an indication of the particular channel with which the current live stream is associated. For example, the channel identifier may be a numerical value, a string, and/or any other type of identifier. The session identifier may provide an indication of a current session associated with the live stream, such that the session may be distinguished from previous live streams and/or other live streams associated with other channels.

As a live stream progresses, segments (for example, video and/or audio segments) from the live stream may be stored in data storage 517, such as a database, for example. The stored segments may form the VOD that may be maintained in data storage for future access by a viewer (the stored segments may also be post-processed in any suitable manner before being stored as a VOD).

Additionally, throughout the live stream, the transcode server may periodically communicate with the VOD manager 519 to provide status updates. The updates may include information (such as the channel identifier, session identifier, current segment number, and/or any other types of information). Alternatively, the VOD manager 519 may periodically request such information from any known transcode servers performing transcoding for live streams. This information may be maintained by the VOD manager 519. Thus, when the first transcode server 512 experiences a failure event, the VOD manager 519 is still aware of the current state of the VOD for that particular channel.

When the second transcode server 513 is instructed to take over transcoding tasks from the first transcode server for the live stream, the second transcode server 513 may transmit a message to the VOD manager 519. This message may include similar information provided by the first transcode server 512 to the VOD manager 519 when the first transcode server 512 begin performing transcode tasks for the live stream. The VOD manager 519 may compare some or all of the information to stored information about current live streams, the VOD manager 519 may determine if the content being transcoded by the second transcode server 513 is associated with the same live stream. For example, the channel and/or session identifiers may be the same.

Additionally, the VOD manager 519 may also consider other information when determining if segments received from the second transcode server 513 are associated with the segments provided by the first transcode server 512. For example, the VOD manager 519 may compare a difference in time between the last segment received from the first transcode server 512 and the first segment received from the second transcode server 513. This difference satisfying a threshold value (for example, being less than, less than or equal to, etc.) may be additional information considered by the VOD manager 519. For example, the VOD manager 519 may determine that the segments received from the second transcode server 513 are associated with the segments provided by the first transcode server 512 based on this threshold being satisfied (which may also be considered in combination with other information). Likewise, in some instances, the VOD manager 519 may determine that the segments received from the second transcode server 513 are not associated with the segments provided by the first transcode server 512 based on the threshold not being satisfied (for example, the difference is greater than the threshold, greater than or equal to the threshold, etc.).

Once the VOD manager 519 determines that the segments received from the second transcode server 513 are associated with the same live stream, the VOD manager 519 may indicate that the segments received from the second transcode server 513 should be combined (e.g., "stitched together") with the segments received from the first transcode server 512 that are already stored in data storage 517. This is performed to form a single VOD for the live stream. The VOD manager 519 may also instruct the second transcoder server to start providing periodic updates with a segment number starting from. Otherwise, the second transcode server may begin from a first segment.

The system architecture 500 illustrates another type of problem that may be mitigated by the improved system architectures described herein. That is, there may exist a delay between the first transcode server 512 experiencing a failure event and the second transcode server 513 taking over transcoding tasks. This may cause latency in the liver stream and may also result in content loss (for example, the content may not be recorded and stored in the VOD).

Figure 6:
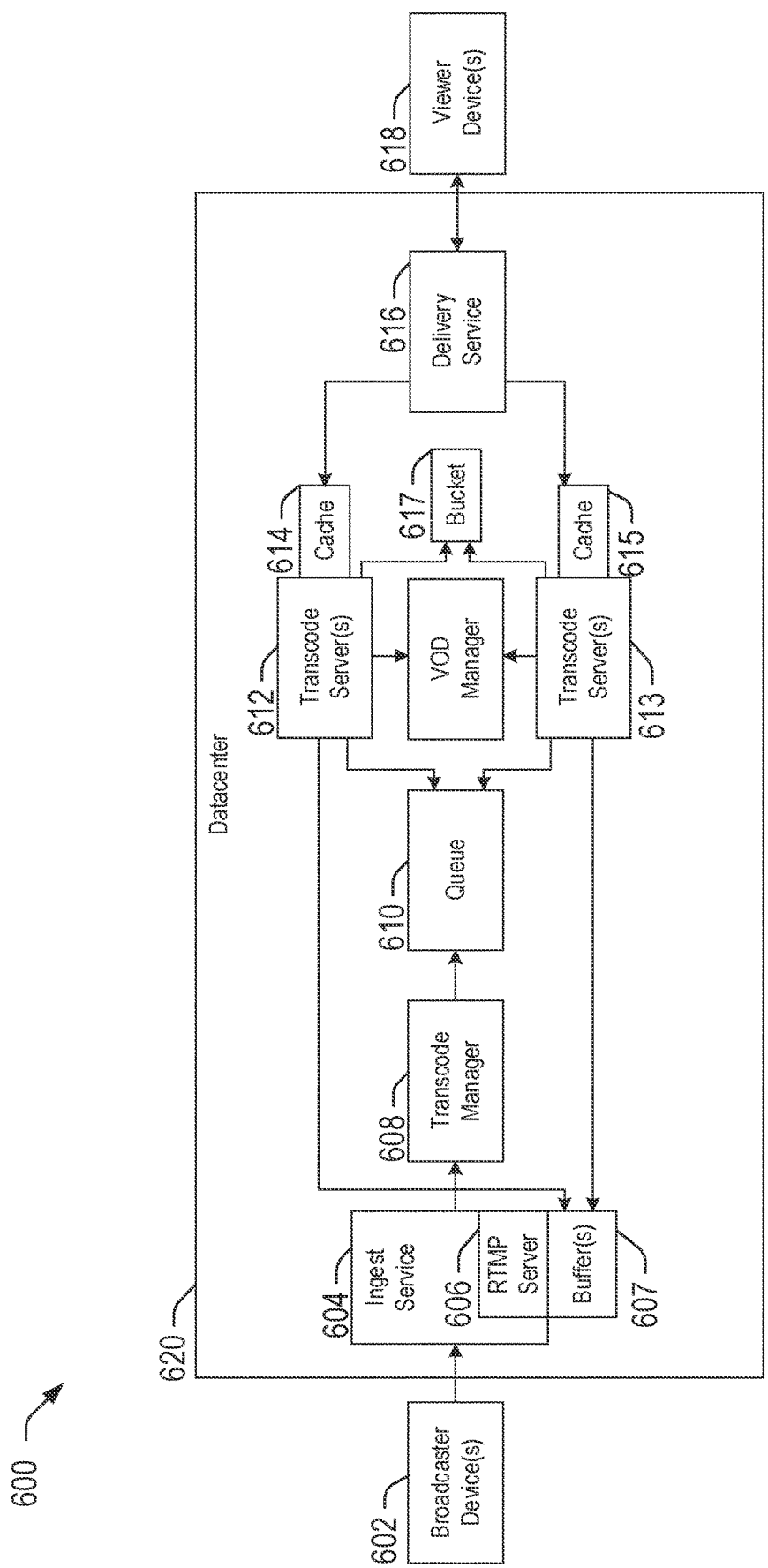
FIG. 6 depicts another example system architecture for low latency and lossless content streaming in accordance with one or more example embodiments of the disclosure.

These potential downfalls associated with the existing system architecture 500 shown in FIG. 5 may be mitigated or eliminated by the improved system architecture 600 shown in FIG. 6. Similar to the improved system architecture 400 shown in FIG. 4, the system architecture 600 shown in FIG. 6 also introduces a buffer 607 (which may be a dynamic buffer) in the server 606 that buffers the content from the live stream for a certain period of time if no transcoder is performing transcoding. While the content is cached in the buffer 607 at the server 604, there may be no content loss during this downtime.

In embodiments, any of the elements of any of the system architectures 200, 300, 400, 500, and 600 (for example, broadcaster device(s) 202, viewer device(s) 218, ingest service 204, transcode manager service 208, queue 210, transcoder server(s) 212 including cache 214, delivery service 216, and/or any other element described with respect to FIG. 2, for example, as well as any other element describe with respect to any of the other system architectures) may be configured to communicate via a communications network. The communications network may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network may have any suitable communication range associated therewith and may include, for example, global networks (e.g., the Internet), metropolitan area networks (MANs), wide area networks (WANs), local area networks (LANs), or personal area networks (PANs). In addition, communications network 450 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Additionally, any of the elements of any of the system architectures 200, 300, 400, 500, and 600 (for example, broadcaster device(s) 202, viewer device(s) 218, ingest service 204, transcode manager service 208, queue 210, transcoder server(s) 212 including cache 214, delivery service 216, and/or any other element described with respect to FIG. 2, for example, as well as any other element describe with respect to any of the other system architectures) may include any of the elements of the computing device 900 as well (such as the processor 902, memory 904, etc.).

Figure 7:
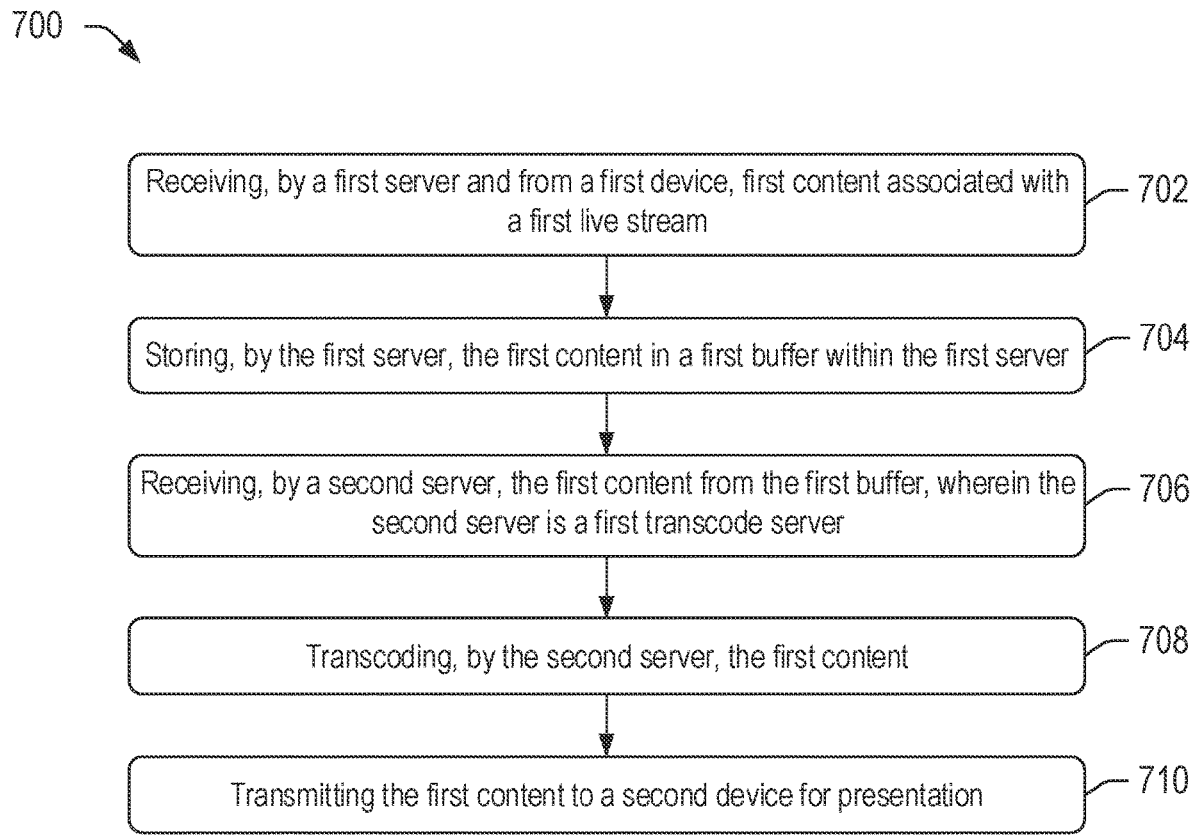
FIG. 7 depicts an example method for low latency and lossless content streaming in accordance with one or more example embodiments of the disclosure.

FIG. 7 depicts an example method 700 for low latency and lossless content streaming. Some or all of the blocks of the process flows or methods in this disclosure may be performed in a distributed manner across any number of devices or systems (for example, any of the elements of system architectures 300, 400, 600, computing device 900, etc.). The operations of the method 700 may be optional and may be performed in a different order.

At block 702 of the method 700, computer-executable instructions stored on a memory of a system or device, such as, any of the elements of system architectures 300, 400, 600, computing device 900, etc., may be executed to receive, by a first server and from a first device, first content associated with a first live stream. For example, the first server may be an ingest service, such as any of ingest services 304, 404, 604, etc. and the first device may be a broadcaster device, such as any of broadcaster device(s) 302, 402, 602, etc.

At block 704 of the method 700, computer-executable instructions stored on a memory of a system or device may be executed to store, by the first server, the first content in a first buffer within the first server. That is, as the content is received from the broadcaster device(s), it may be temporarily stored in a buffer (such as buffers 407, 607, and/or any other buffer described herein or otherwise).

By using this buffer, when a transcode server (for example, any of transcode servers 312, 412, 612, 613, etc.) commences processing content associated with the live stream, the transcode server may retrieve the content from the buffer, rather than receiving the content in real-time as it is received from broadcaster device(s) that are used to generate the content for the live stream. In existing systems, the transcode server may otherwise be required to perform real-time data retrieval, which may introduce increased latency. The buffer therefore enables the transcode server to rapidly retrieve and initiate processing on all available content. Using the first use case as an example, this allows the initial media segments of the live stream to become available much sooner compared to the conventional real-time data waiting process. Moreover, since all content is cached within the buffer, content loss prior to stream startup is entirely averted.

At block 706 of the method 700, computer-executable instructions stored on a memory of a system or device may be executed to At block 704 of the method 700, computer-executable instructions stored on a memory of a system or device may be executed to receive, by a second server, the first content from the first buffer, wherein the second server is a first transcode server. That is, when the first transcode server is instructed to begin transcoding content from the broadcaster device(s), the content may be accessed directly from the buffer, thereby reducing latency in performing the transcoding.

At block 708 of the method 700, computer-executable instructions stored on a memory of a system or device may be executed at block 704 of the method 700, computer-executable instructions stored on a memory of a system or device may be executed to transcode, by the first server, the first content in a first buffer within the first server. That is, the first transcode server may begin transcoding content such that the content may then be transmitted to the viewer device(s).

At block 710 of the method 700, computer-executable instructions stored on a memory of a system or device may be executed at block 704 of the method 700, computer-executable instructions stored on a memory of a system or device may be executed to transmit the first content to a second device for presentation. That is, the transcoded content may then be transmitted to viewer device(s), such as any of viewer device(s) 318, 418, 618, etc. Thus, a viewer may view the live stream in real-time using the viewer device.

Figure 8:
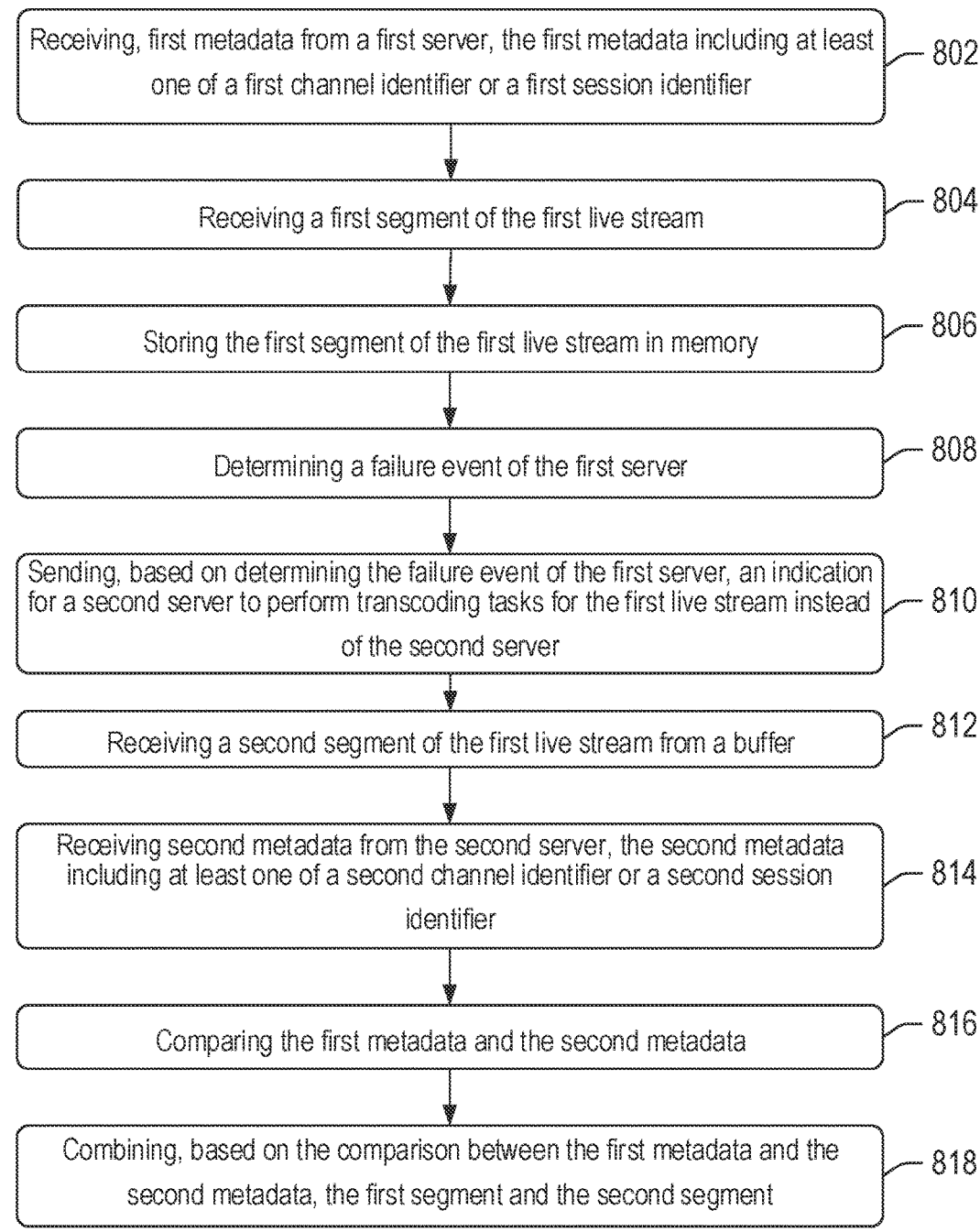
FIG. 8 depicts another example method for low latency and lossless content streaming in accordance with one or more example embodiments of the disclosure.

FIG. 8 depicts an example method 800 for low latency and lossless content streaming. Some or all of the blocks of the process flows or methods in this disclosure may be performed in a distributed manner across any number of devices or systems (for example, any of the elements of system architectures 300, 400, 600, computing device 900, etc.). The operations of the method 800 may be optional and may be performed in a different order.

At block 802 of the method 800, computer-executable instructions stored on a memory of a system or device, such as, any of the elements of system architectures 300, 400, 600, computing device 900, etc., may be executed to receive, first metadata from a first server, the first metadata including at least one of a first channel identifier or a first session identifier. For example, the first server may be a transcode server that is tasked with performing transcode tasks for a channel of a live stream service.

As aforementioned, every time a transcode server is instructed to begin performing transcoding tasks for a channel, the transcode server may send a message to a service, such as VOD manager 519, to track the status of the live stream. The message may include any number of different types of information, such as a channel identifier, a session identifier, etc. The channel identifier may provide an indication of the particular channel with which the current live stream is associated. For example, the channel identifier may be a numerical value, a string, and/or any other type of identifier. The session identifier may provide an indication of a current session associated with the live stream, such that the session may be distinguished from previous live streams and/or other live streams associated with other channels.

At block 804 of the method 800, computer-executable instructions stored on a memory of a system or device may be executed to receive a first segment of the first live stream. That is, segments of the live stream content (such as audio and/or video segments) may be received for processing and transmission to one or more viewer devices to allow viewers to view the live stream content. The segments also may be temporarily stored in a buffer, such as buffer 108, buffer 407, buffer 607, and/or any other buffer described herein or otherwise.

At block 806 of the method 800, computer-executable instructions stored on a memory of a system or device may be executed to store the first segment of the first live stream in memory. In embodiments, the memory may be a data storage, such as a database. That is, copies of the content that is produced during the live stream may be stored in data storage (such as data storage 116, data storage 517 and 617, etc.) as a "video on demand" that is accessible by viewers even after the live stream has ended.

At block 808 of the method 808, computer-executable instructions stored on a memory of a system or device may be executed to determine a failure event of the first server. For example, the server may experience a hardware and/or software issue that may cause the server to become at least temporarily unavailable to transcode segments from the live stream.

At block 810 of the method 810, computer-executable instructions stored on a memory of a system or device may be executed to send, based on determining the failure event of the first server, an indication for a second server to perform transcoding tasks for the first live stream instead of the second server.

At block 812 of the method 800, computer-executable instructions stored on a memory of a system or device may be executed to receive a second segment of the first live stream from a buffer.

At block 814 of the method 800, computer-executable instructions stored on a memory of a system or device may be executed to receive, second metadata from the second server, the second metadata including at least one of a second channel identifier or a second session identifier.

At block 816 of the method 800, computer-executable instructions stored on a memory of a system or device may be executed to compare the first metadata and the second metadata. At block 818 of the method 800, computer-executable instructions stored on a memory of a system or device may be executed to combine, based on the comparison between the first metadata and the second metadata, the first segment and the second segment. That is, if it is determined that the segment received from the second transcode server is associated with the same live stream as the segments previously stored in memory, these segments may be combined to form a continuous video on demand including all of the live stream content (even the segments transcoded by the second server after the failure event associated with the first server).

Figure 9:
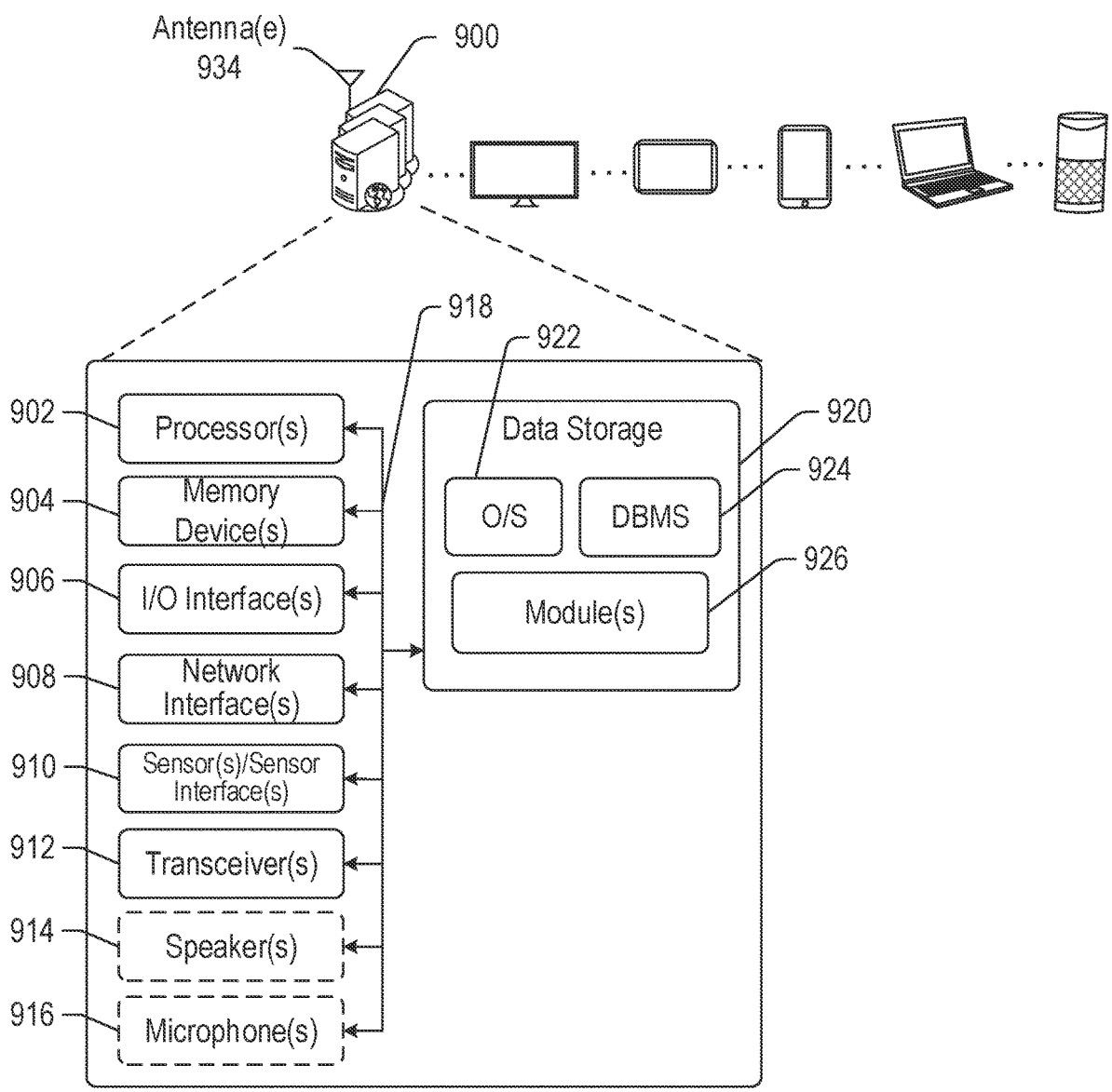
FIG. 9 depicts an example computing device in accordance with one or more example embodiments of the disclosure.

FIG. 9 is a schematic block diagram of an illustrative computing device 900 in accordance with one or more example embodiments of the disclosure. The computing device 900 may include any suitable computing device capable of receiving and/or generating data including, but not limited to, a user device such as a smartphone, tablet, e-reader, wearable device, or the like; a desktop computer; a laptop computer; a content streaming device; a set-top box; or the like. The computing device 900 may correspond to an illustrative device configuration for the devices of FIGS. 1-8 (such as any of the elements of the system architectures 200, 300, 400, 500, 600, etc., for example).

The computing device 900 may be configured to communicate via one or more networks with one or more servers, search engines, user devices, or the like. In some embodiments, a single remote server or single group of remote servers may be configured to perform more than one type of content rating and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 900 may include one or more processor(s) 902, one or more memory devices 904 (generically referred to herein as memory 904), one or more input/output (I/O) interface(s) 906, one or more network interface(s) 908, one or more sensors or sensor interface(s) 910, one or more transceivers 912, one or more optional speakers 914, one or more optional microphones 916, and data storage 920. The computing device 900 may further include one or more buses 918 that functionally couple various components of the computing device 900. The computing device 900 may further include one or more antenna (e) 934 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 918 may include at least one of a system bus, a memory bus, an address bus, or a message bus, and may permit exchange of information (e.g., data (including computer-executable code), signaling, etc.) between various components of the computing device 900. The bus(es) 918 may include, without limitation, a memory bus or a memory controller, a peripheral bus, an accelerated graphics port, and so forth. The bus(es) 918 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 904 of the computing device 900 may include volatile memory (memory that maintains its state when supplied with power) such as random-access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 904 may include multiple different types of memory, such as various types of static random-access memory (SRAM), various types of dynamic random-access memory (DRAM), various types of unalterable ROM, and/or writeable variants of ROM such as electrically erasable programmable read-only memory (EEPROM), flash memory, and so forth. The memory 904 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 920 may include removable storage and/or non-removable storage including, but not limited to, magnetic storage, optical disk storage, and/or tape storage. The data storage 920 may provide non-volatile storage of computer-executable instructions and other data. The memory 904 and the data storage 920, removable and/or non-removable, are examples of computer-readable storage media (CRSM) as that term is used herein.

The data storage 920 may store computer-executable code, instructions, or the like that may be loadable into the memory 904 and executable by the processor(s) 902 to cause the processor(s) 902 to perform or initiate various operations. The data storage 920 may additionally store data that may be copied to memory 904 for use by the processor(s) 902 during the execution of the computer-executable instructions. Moreover, output data generated as a result of the execution of the computer-executable instructions by the processor(s) 902 may be stored initially in memory 904 and may ultimately be copied to data storage 920 for non-volatile storage.

More specifically, the data storage 920 may store one or more operating systems (O/S) 922; one or more database management systems (DBMS) 924; and one or more program module(s), applications, engines, computer-executable code, scripts, or the like, such as, for example, one or more module(s) 926. Any of the components depicted as being stored in data storage 920 may include any combination of software, firmware, and/or hardware. The software and/or firmware may include computer-executable code, instructions, or the like that may be loaded into the memory 904 for execution by one or more of the processor(s) 902. Any of the components depicted as being stored in data storage 920 may support functionality described in reference to correspondingly named components earlier in this disclosure.

The data storage 920 may further store various types of data utilized by components of the computing device 900. Any data stored in the data storage 920 may be loaded into the memory 904 for use by the processor(s) 902 in executing computer-executable code. In addition, any data depicted as being stored in the data storage 920 potentially may be stored in one or more datastore(s) and may be accessed via the DBMS 924 and loaded in the memory 904 for use by the processor(s) 902 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 9, the datastore(s) may include, for example, purchase history information, user action information, user profile information, a database linking search queries and user actions, and other information.

The processor(s) 902 may be configured to access the memory 904 and execute computer-executable instructions loaded therein. For example, the processor(s) 902 may be configured to execute computer-executable instructions of the various program module(s), applications, engines, or the like of the computing device 900 to cause or facilitate various operations to be performed in accordance with one or more embodiments of the disclosure. The processor(s) 902 may include any suitable processing unit capable of accepting data as input, processing the input data in accordance with stored computer-executable instructions, and generating output data. The processor(s) 902 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 902 may have any suitable microarchitecture design that includes any number of constituent components, such as, for example, registers, multiplexers, arithmetic logic units, cache controllers for controlling read/write operations to cache memory, branch predictors, or the like. The microarchitecture design of the processor(s) 902 may be capable of supporting any of a variety of instruction sets.

Referring now to functionality supported by the various program module(s) depicted in FIG. 9, the module(s) 926 may include computer-executable instructions, code, or the like that responsive to execution by one or more of the processor(s) 902 may perform any functions described herein (for example, functions associated with any of the elements of systems 200-600, etc.), including, but not limited to, receiving content associated with a live stream processing the content, and/or transmitting the content to viewer devices.

Referring now to other illustrative components depicted as being stored in the data storage 920, the O/S 922 may be loaded from the data storage 920 into the memory 904 and may provide an interface between other application software executing on the computing device 900 and hardware resources of the computing device 900. More specifically, the O/S 922 may include a set of computer-executable instructions for managing hardware resources of the computing device 900 and for providing common services to other application programs (e.g., managing memory allocation among various application programs). In certain example embodiments, the O/S 922 may control execution of the other program module(s) to dynamically enhance characters for content rendering. The O/S 922 may include any operating system now known or which may be developed in the future including, but not limited to, any server operating system, any mainframe operating system, or any other proprietary or non-proprietary operating system.

The DBMS 924 may be loaded into the memory 904 and may support functionality for accessing, retrieving, storing, and/or manipulating data stored in the memory 904 and/or data stored in the data storage 920. The DBMS 924 may use any of a variety of database models (e.g., relational model, object model, etc.) and may support any of a variety of query languages. The DBMS 924 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computing device 900 is a user device, the DBMS 924 may be any suitable light weight DBMS optimized for performance on a user device.

Referring now to other illustrative components of the computing device 900, the input/output (I/O) interface(s) 906 may facilitate the receipt of input information by the computing device 900 from one or more I/O devices as well as the output of information from the computing device 900 to the one or more I/O devices. The I/O devices may include any of a variety of components, such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 900 or may be separate. The I/O devices may further include, for example, any number of peripheral devices, such as data storage devices, printing devices, and so forth.

The I/O interface(s) 906 may also include an interface for an external peripheral device connection, such as universal serial bus (USB), FireWire, Thunderbolt, Ethernet port, or other connection protocol that may connect to one or more networks. The I/O interface(s) 906 may also include a connection to one or more of the antenna (e) 934 to connect to one or more networks via a wireless local area network (WLAN) (such as Wi-Fi) radio, Bluetooth, ZigBee, and/or a wireless network radio, such as a radio capable of communication with a wireless communication network, such as a Long-Term Evolution (LTE) network, WiMAX network, 3G network, ZigBee network, etc.

The computing device 900 may further include one or more network interface(s) 908 via which the computing device 900 may communicate with any of a variety of other systems, platforms, networks, devices, and so forth. The network interface(s) 908 may enable communication, for example, with one or more wireless routers, one or more host servers, one or more web servers, and the like via one or more of networks.

The antenna (e) 934 may include any suitable type of antenna depending, for example, on the communications protocols used to transmit or receive signals via the antenna (e) 934. Non-limiting examples of suitable antennas may include directional antennas, non-directional antennas, dipole antennas, folded dipole antennas, patch antennas, multiple-input multiple-output (MIMO) antennas, or the like. The antenna (e) 934 may be communicatively coupled to one or more transceivers 912 or radio components to which or from which signals may be transmitted or received.

As previously described, the antenna (e) 934 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna (e) 934 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, and 802.11n), 5 GHz channels (e.g., 802.11n and 802.11ac), or 60 GHz channels (e.g., 802.11ad). In alternative example embodiments, the antenna (e) 934 may be configured to transmit or receive radio frequency signals within any suitable frequency range forming part of the unlicensed portion of the radio spectrum.

The antenna (e) 934 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS, such as, for example, the Global Positioning System (GPS), the GLONASS System, the Compass Navigation System, the Galileo System, or the Indian Regional Navigational System.

The transceiver(s) 912 may include any suitable radio component(s) for—in cooperation with the antenna (e) 934—transmitting or receiving radio frequency (RF) signals in the bandwidth and/or channels corresponding to the communications protocols utilized by the computing device 900 to communicate with other devices. The transceiver(s) 912 may include hardware, software, and/or firmware for modulating, transmitting, or receiving—potentially in cooperation with any of antenna (e) 934—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 912 may further include hardware, firmware, or software for receiving GNSS signals. The transceiver(s) 912 may include any known receiver and baseband suitable for communicating via the communications protocols utilized by the computing device 900. The transceiver(s) 912 may further include a low noise amplifier (LNA), additional signal amplifiers, an analog-to-digital (A/D) converter, one or more buffers, a digital baseband, or the like.

The sensor(s)/sensor interface(s) 910 may include or may be capable of interfacing with any suitable type of sensing device, such as, for example, inertial sensors, force sensors, thermal sensors, and so forth. Example types of inertial sensors may include accelerometers (e.g., MEMS-based accelerometers), gyroscopes, and so forth.

The optional speaker(s) 914 may be any device configured to generate audible sound. The optional microphone(s) 916 may be any device configured to receive analog sound input or voice data.

It should be appreciated that the program module(s), applications, computer-executable instructions, code, or the like depicted in FIG. 9 as being stored in the data storage 920 are merely illustrative and not exhaustive and that processing described as being supported by any particular module alternatively may be distributed across multiple module(s) or performed by a different module. In addition, various program module(s), script(s), plug-in(s), Application Programming Interface(s) (API(s)), or any other suitable computer-executable code hosted locally on the computing device 900, and/or hosted on other computing device(s) accessible via one or more networks, may be provided to support functionality provided by the program module(s), applications, or computer-executable code depicted in FIG. 9 and/or additional or alternate functionality. Further, functionality may be modularized differently such that processing described as being supported collectively by the collection of program module(s) depicted in FIG. 9 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionalities described as being supported by any of the program module(s) depicted in FIG. 9 may be implemented, at least partially, in hardware and/or firmware across any number of devices.

It should further be appreciated that the computing device 900 may include alternate and/or additional hardware, software, or firmware components beyond those described or depicted without departing from the scope of the disclosure. More particularly, it should be appreciated that software, firmware, or hardware components depicted as forming part of the computing device 900 are merely illustrative and that some components may not be present or additional components may be provided in various embodiments. While various illustrative program module(s) have been depicted and described as software module(s) stored in data storage 920, it should be appreciated that functionality described as being supported by the program module(s) may be enabled by any combination of hardware, software, and/or firmware. It should further be appreciated that each of the above-mentioned module(s), in various embodiments, may represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module, in various embodiments, may be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language, such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together, such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random-access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium that can be used to store the information and can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
   receiving, by a media ingestion server and from a broadcaster device, a first content segment associated with a first live stream;
   storing, by the media ingestion server, the first content segment in a first buffer within the media ingestion server before a broadcast start event of the first live stream;
   receiving, first metadata from a first transcode server, the first metadata including at least one of a first channel identifier or a first session identifier;
   receiving, by the first transcode server, the first content segment from the first buffer;
   transcoding, by the first transcode server, the first content segment;
   transmitting the first content segment to a viewer device for presentation;
   storing a copy of the first content segment in a database as a portion of a video on demand;
   determining a failure event of the first transcode server;
   sending, based on determining the failure event of the first transcode server, an indication for a second transcode server to perform transcoding tasks for the first live stream instead of the first transcode server;
   receiving a second content segment of the first live stream;
   receiving, second metadata from the second transcode server, the second metadata including at least one of a second channel identifier or a second session identifier;
   comparing the first metadata and the second metadata; and
   combining, based on the comparison between the first metadata and the second metadata, the first content segment and the second content segment in the video on demand.

2. The method of claim 1, wherein the second content segment is received from the first buffer.

3. The method of claim 1, wherein combining the first content segment and the second content segment is further based on:
   determining that the first channel identifier is the same as the second channel identifier; and
   determining that a difference between a first time at which the first metadata was received and a second time at which the second metadata was received is less than a threshold amount of time.

4. The method of claim 1, wherein second content associated with a second live stream is stored in a second buffer, and wherein the second buffer is a different size than the first buffer.

5. A method comprising:
   receiving, by a first server and from a first device, first content associated with a first live stream;
   receiving, first metadata from a second server, wherein the first metadata comprises at least one of a first channel identifier or a first session identifier, and wherein the second server is a first transcode server;
   receiving a first segment of the first live stream;
   storing the first segment of the first live stream;
   determining a failure event of a second server;
   sending, based on determining the failure event of the second server, an indication for a third server to perform transcoding tasks for the first live stream instead of the second server;
   receiving a second segment of the first live stream;
   receiving, second metadata from the third server, the second metadata including at least one of a second channel identifier or a second session identifier;
   comparing the first metadata and the second metadata;
   combining, based on the comparison between the first metadata and the second metadata, the first segment and the second segment; and
   transmitting the first content to a second device for presentation.

6. The method of claim 5, wherein the first device is a broadcaster device associated with a broadcaster of the first live stream, and wherein the second device is a viewer device associated with a user viewing the first live stream.

7. The method of claim 5, wherein the first content is stored in a first buffer before a broadcast start event of the first live stream.

8. The method of claim 7, wherein second content associated with a second live stream is stored in a second buffer, and wherein the second buffer is a different size than the first buffer.

9. The method of claim 8, further comprising:
   allocating, during the first live stream, a third buffer to the first live stream instead of the first buffer; and
   receiving, by the second server, second content associated with the first live stream from the third buffer.

10. The method of claim 7, wherein the second segment is received from the first buffer.

11. The method of claim 7, wherein combining the first segment and the second segment is further based on:
- determining that the first channel identifier is the same as the second channel identifier; and
- determining that a difference between a first time at which the first metadata was received and a second time at which the second metadata was received is less than a threshold amount of time.

12. A system comprising:
memory that stores computer-executable instructions; and
one or more processors configured to access the memory and execute the computer-executable instructions to:
- receive, by a first server and from a first device, first content associated with a first live stream;
- receive, first metadata from a second server, wherein the first metadata comprises at least one of a first channel identifier or a first session identifier, and wherein the second server is a first transcode server;
- receive a first segment of the first live stream;
- store the first segment of the first live stream;
- determine a failure event of a second server;
- send, based on determining the failure event of the second server, an indication for a third server to perform transcoding tasks for the first live stream instead of the second server;
- receive a second segment of the first live stream;
- receive, second metadata from the third server, the second metadata including at least one of a second channel identifier or a second session identifier;
- compare the first metadata and the second metadata;
- combine, based on the comparison between the first metadata and the second metadata, the first segment and the second segment; and
- transmit the first segment and the second segment to a second device for presentation.

13. The system of claim 12, wherein the first device is a broadcaster device associated with a broadcaster of the first live stream, and wherein the second device is a viewer device associated with a user viewing the first live stream.

14. The system of claim 12, wherein the first content is stored in a first buffer before a broadcast start event of the first live stream.

15. The system of claim 14, wherein second content associated with a second live stream is stored in a second buffer, and wherein the second buffer is a different size than the first buffer.

16. The system of claim 15, wherein the one or more processors are further configured to execute the computer-executable instructions to:
- allocate, during the first live stream, a third buffer to the first live stream instead of the first buffer; and
- receive, by the second server, second content associated with the first live stream from the third buffer.

17. The system of claim 14, wherein the second segment is received from the first buffer.

18. The system of claim 14, wherein combining the first segment and the second segment is further based on:
- determine that the first channel identifier is the same as the second channel identifier; and
- determine that a difference between a first time at which the first metadata was received and a second time at which the second metadata was received is less than a threshold amount of time.

* * * * *